Nov. 8, 1966  A. F. ROMANOWSKI  3,284,000
FLAP TYPE INDICATORS

Filed July 5, 1962  7 Sheets-Sheet 1

INVENTOR.
ALBERT F. ROMANOWSKI
BY
Albert L. Jeffers
ATTORNEY

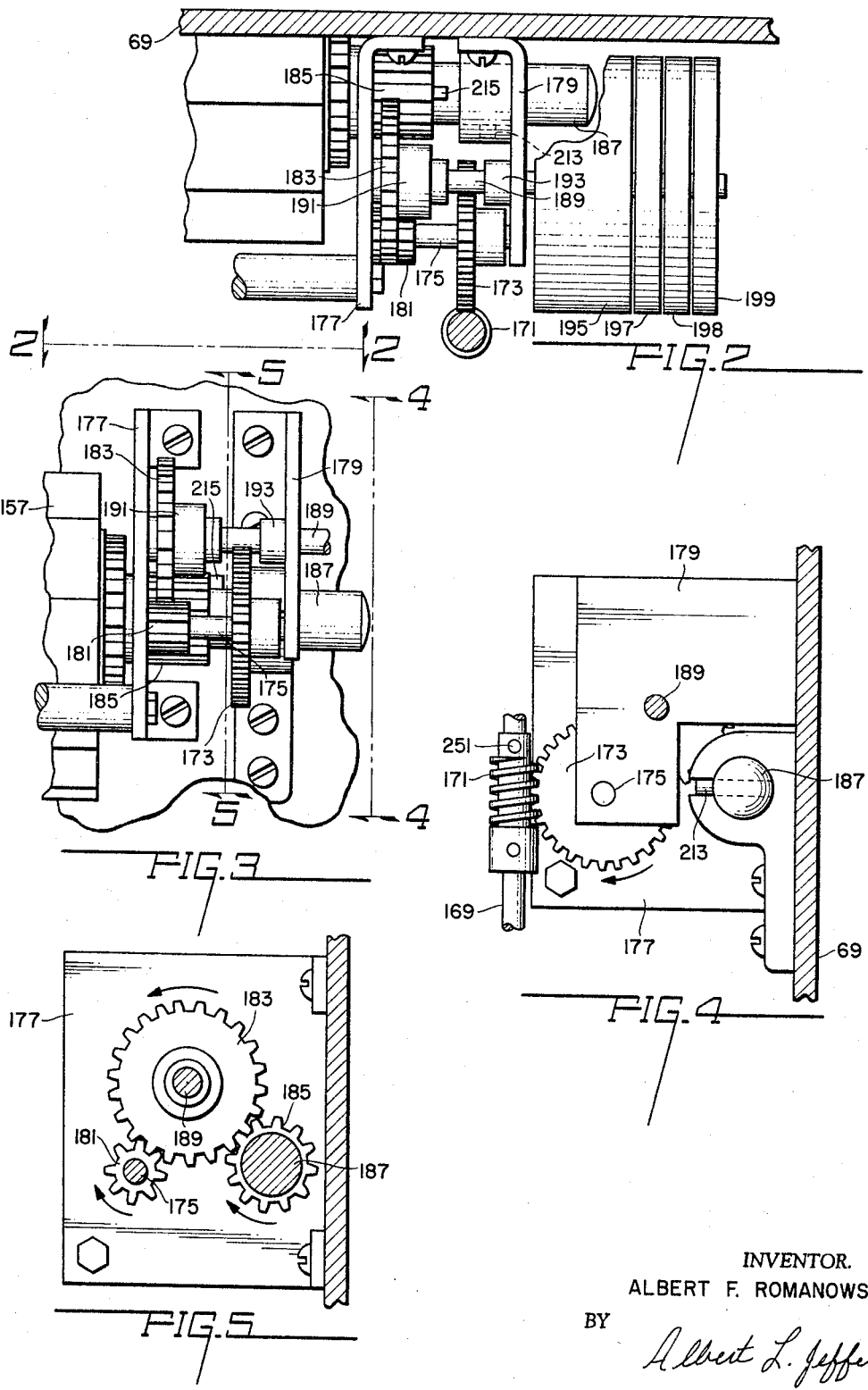

Nov. 8, 1966
A. F. ROMANOWSKI
3,284,000
FLAP TYPE INDICATORS
Filed July 5, 1962
7 Sheets-Sheet 4
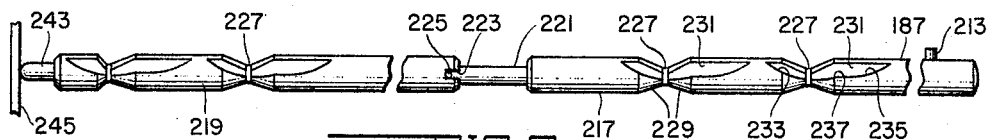
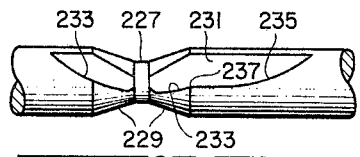
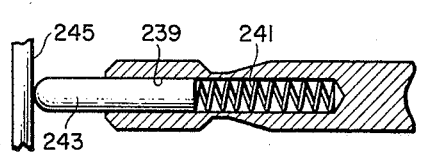
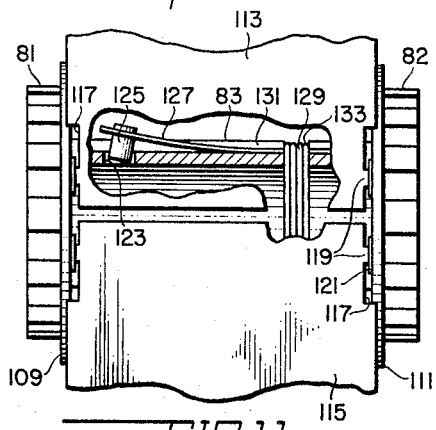
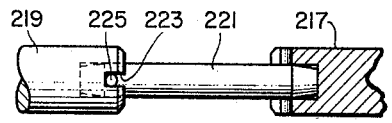
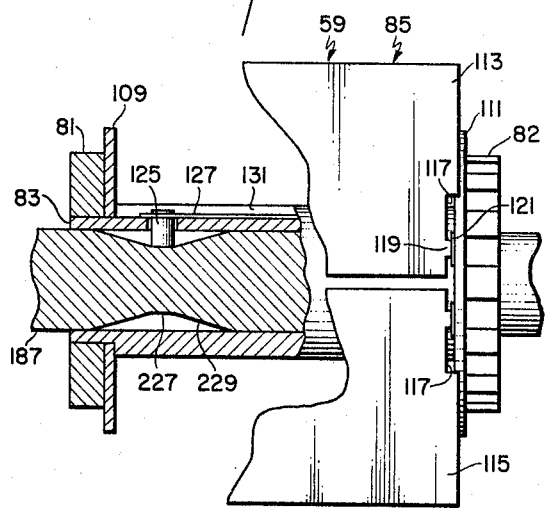
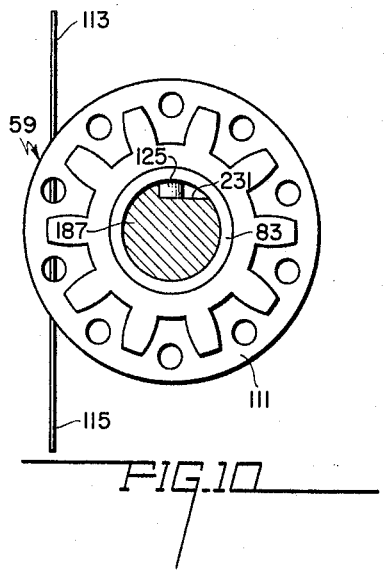
INVENTOR.
ALBERT F. ROMANOWSKI
BY
Albert L. Jeffers
ATTORNEY Nov. 8, 1966  A. F. ROMANOWSKI  3,284,000
FLAP TYPE INDICATORS Filed July 5, 1962  7 Sheets-Sheet 5

INVENTOR.
ALBERT F. ROMANOWSKI
BY Albert L. Jeffers
ATTORNEY

Nov. 8, 1966  A. F. ROMANOWSKI  3,284,000
FLAP TYPE INDICATORS

Filed July 5, 1962  7 Sheets-Sheet 6

INVENTOR.
ALBERT F. ROMANOWSKI
BY
Albert L. Jeffers
ATTORNEY

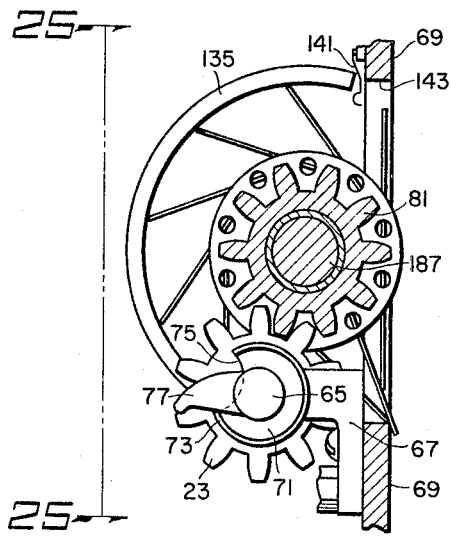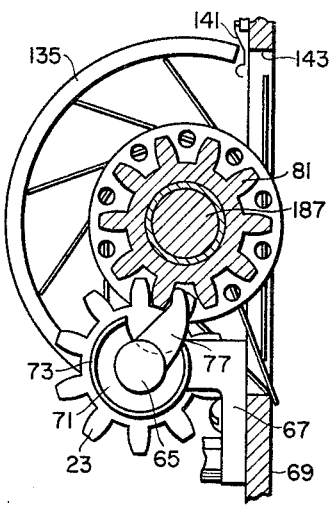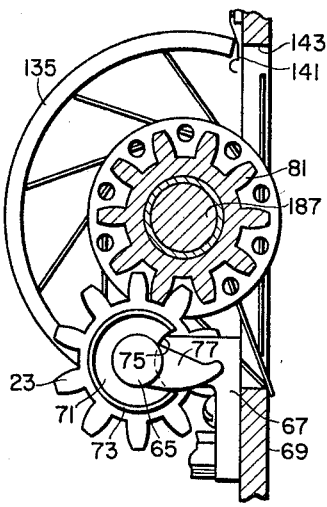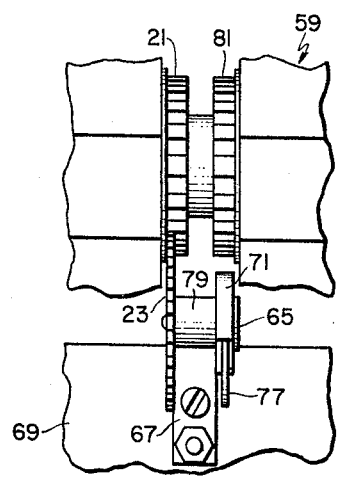

United States Patent Office 3,284,000
Patented Nov. 8, 1966

3,284,000
FLAP TYPE INDICATORS
Albert F. Romanowski, Greenville, Tenn., assignor to Bowser, Inc., Greenville, Tenn., a corporation of Indiana
Filed July 5, 1962, Ser. No. 208,977
10 Claims. (Cl. 235—144)

This invention relates to an improved indicating mechanism and more particularly it relates to a flap type indicating mechanism adapted to be operated by an electronic computer for use in fueling systems.

An object of this invention is to provide an indicator which is adapted to be electrically operated, and which will be reliable and substantially trouble-free in operation.

A further object of this invention is the provision of an indicator for use in fueling systems and provided with a single reset shaft for resetting the gallon indicators and the monetary indicators.

A still further object of this invention is to provide an indicator mechanism having the monetary indicators and gallon indicators on the same horizontal axis.

A salient object of this invention is to provide an indicator mechanism for a fueling system having a reset shaft provided with means to compensate for misalignment of the indicators, and which will positively pick up each individual indicator when the shaft is rotated.

An object of this invention is to provide an indicator mechanism having improved transfer means for actuating the subsequent indicator.

A further object of this invention is to provide an indicator having a reset mechanism provided with a solenoid operated brake to prevent overtraveling in the reset operation.

Other objects of the invention will be pointed out in the following description and claims, and illustrated in the accompanying drawings which disclose by way of example the principle of the invention and the best mode which has been contemplated of applying that principle.

In the drawings:

FIGURE 2 is a detail view taken along line 2—2 of FIGURE 3 illustrating a portion of the reset mechanism;

FIGURE 3 is a detail view illustrating a part of the reset mechanism;

FIGURE 4 is a detail view showing the reset mechanism taken along substantially line 4—4 of FIGURE 3;

FIGURE 5 is a detail view showing the reset mechanism taken along substantially line 5—5 of FIGURE 3;

FIGURE 6 is a detail view illustrating the reset shaft;

FIGURE 7 is a detail view illustrating the reset groves and recesses disposed therein;

FIGURE 8 is a detail view of the reset shaft illustrating the spring loaded pin disposed at one end;

FIGURE 9 is a detail view illustrating the coupling for the reset shaft;

FIGURE 10 is a cross sectional view through the indicator mechanism illustrating the positioning for resetting the indicator;

FIGURE 11 is a detail view of the indicator mechanism;

FIGURE 12 is a detail view of the indicator mechanism positioned for normal operation;

FIGURE 22 is a detail view illustrating the flap wheel and transfer pinion assembly;

FIGURE 23 is a side sectional view showing the flap wheel and transfer pinion assembly;

FIGURE 24 is a side sectional view showing the pinion transfer assembly with the pawl in the contact position;

FIGURE 25 is a detail view taken along line 25—25 of FIGURE 22.

Figure 1A:
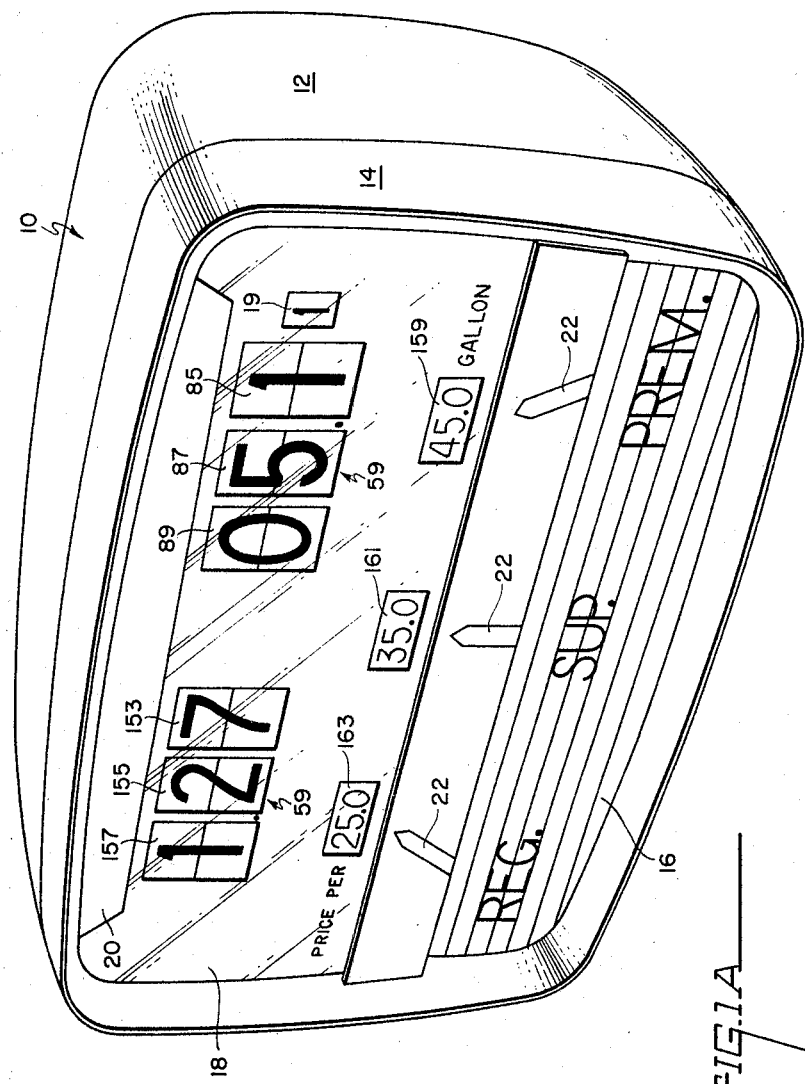
FIGURE 1A is a perspective view showing the indicator as used in a fueling system.

The reference numeral 10 designates an indicator which is adapted to display the gallons of fuel and the price of fuel dispensed in a fueling system. The housing 12 is provided with a front cover 14 having a brand panel 16 and a glass 18 provided with a shaded portion 20 to direct light on the indicators 59. The pointers 22 serve to draw attention to the brand of fuel being dispensed and the price per gallon setting mechanisms 159, 161 and 163.

Figure 1B:
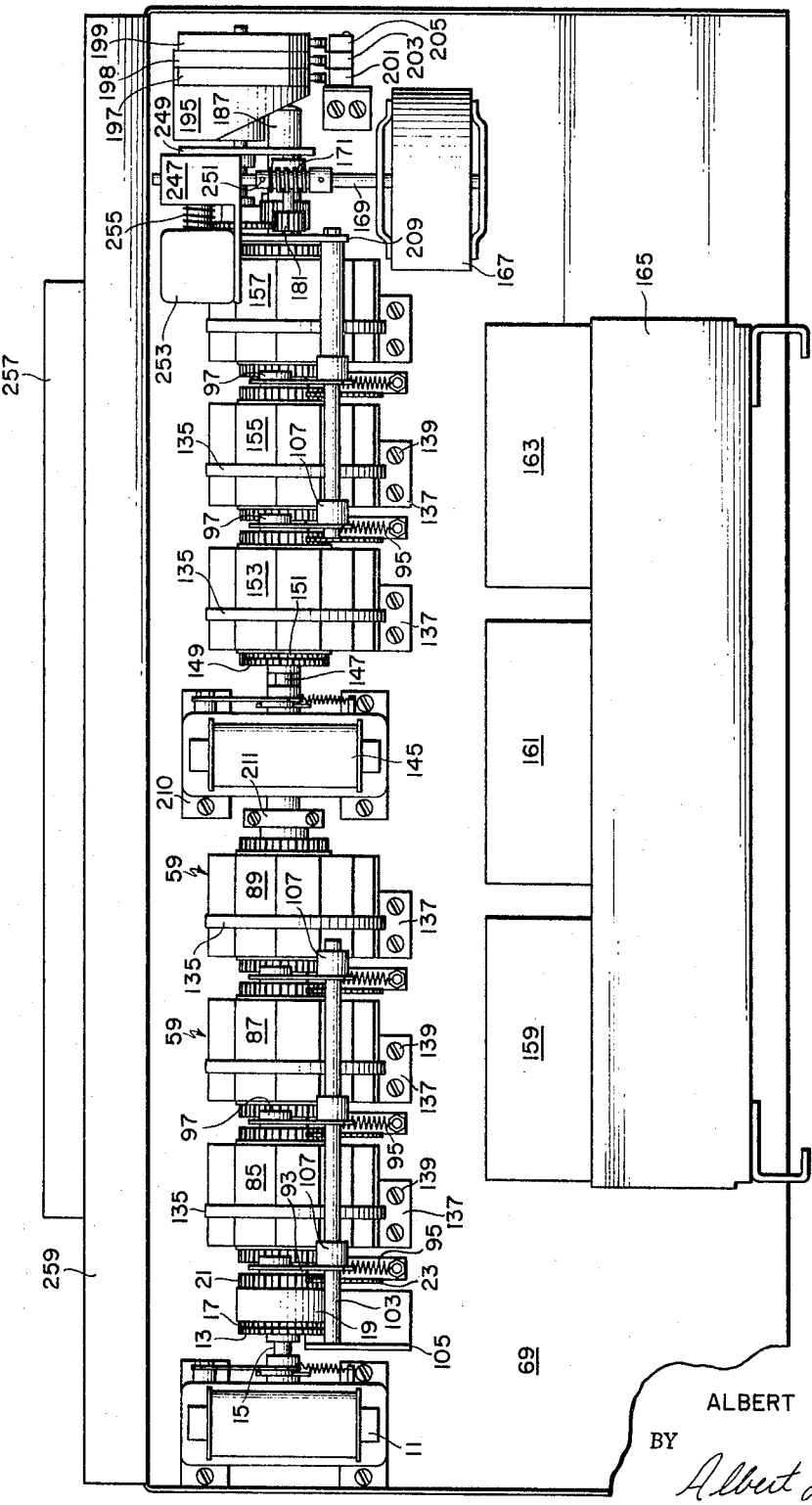
FIGURE 1B is a rear elevational view of the indicator assembly with certain parts being omitted for clarity.
Figure 13:
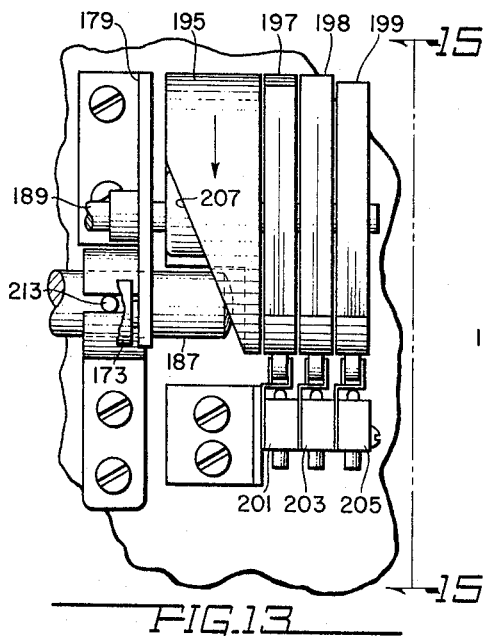
FIGURE 13 is a detail view illustrating the cam and limit switch assembly with the shaft in the normal operation position.

Referring to FIGURE 1B the reference numeral 11 designates the stepping motor responsive to pulses from a transducer and meter (not shown). A drive gear 13 is driven by a shaft 15 which is rotated by the stepping motor 11. The drive gear 13 meshes with a gear 17 which actuates a numeral wheel 19 for designating hundredths of a gallon. The gear 21 is rotated simultaneously with the gear 17 and numeral wheel 19 to actuate a gear 23.

Figure 17:
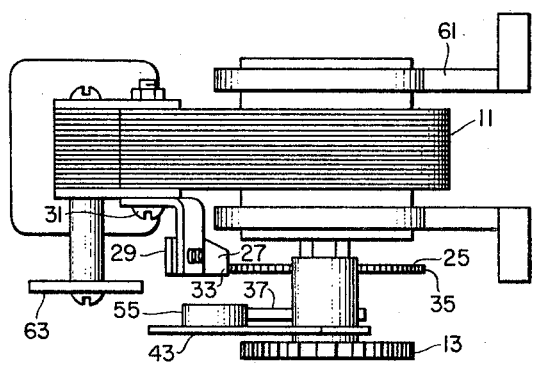
FIGURE 17 is a detail top view of the stepping motor mechanism for actuating the indicators.

Referring to FIGURES 17 through 25, the component parts of the above drive mechanism are illustrated in detail. As shown in FIGURE 17 the stepping motor 11 drives the shaft 15 having mounted thereon a drive gear 13. A ratchet wheel 25 is mounted on the shaft 15 and a leaf spring arm 27 is mounted by a bracket 29 to the stepping motor 11, by a screw 31. The leaf spring is provided with a downwardly turned portion 33 which is in contact with teeth 35 of the ratchet wheel 25. The leaf spring 27 and ratchet wheel which is mounted on the shaft 15 serve to prevent backlashing of the shaft 15 when the stepping motor is started and stopped in rapid succession.

Figure 20:
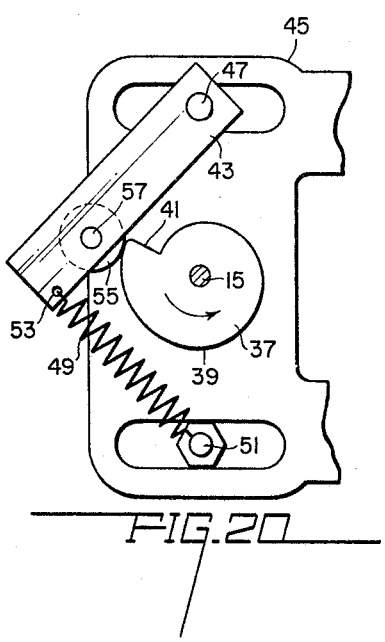
FIGURE 20 is a detail view illustrating the means for providing additional transfer torque, with the cam just prior to the drop-off position.
Figure 18:
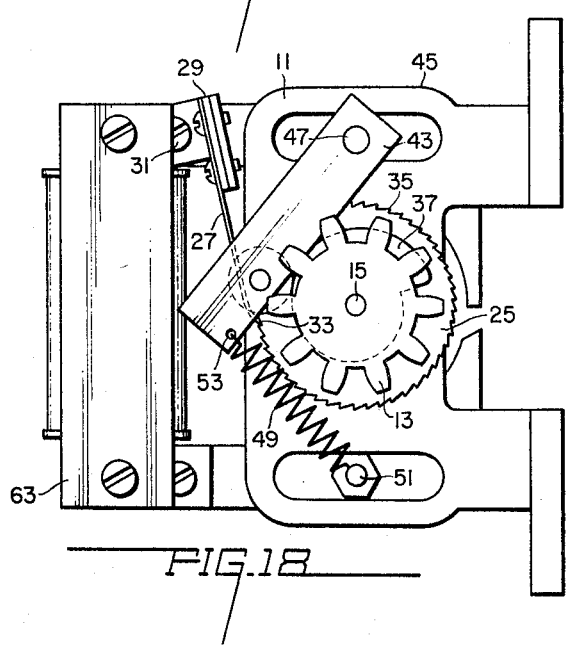
FIGURE 18 is a detail side view of the stepping motor for actuating the indicators.
Figure 21:
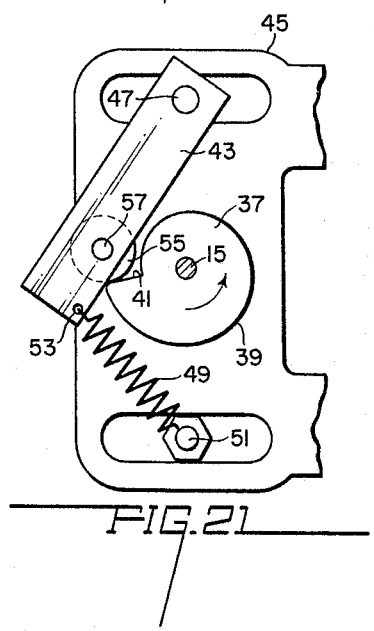
FIGURE 21 is a detail view illustrating the means for providing additional transfer torque, with the cam in the drop-off position.
Figure 19:
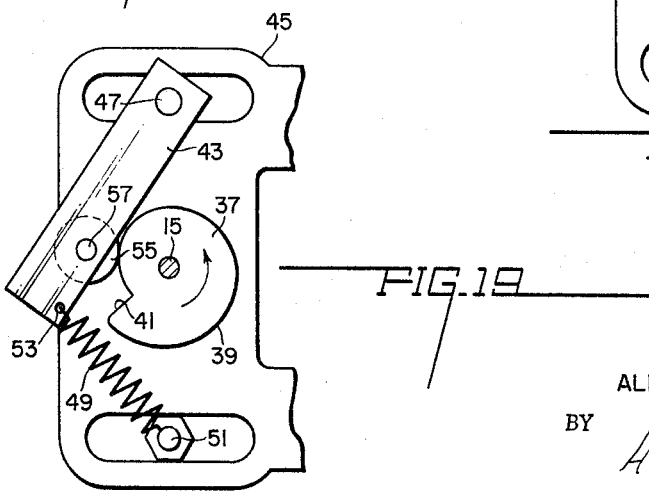
FIGURE 19 is a detail view illustrating the means for providing additional transfer torque, with the cam in the starting position.

Referring to FIGURES 19, 20 and 21, a cam 37 having a gradual rise portion 39 and a drop portion 41 is mounted on the shaft 15. An arm 43 is pivotally mounted to the frame 45 by a pin 47. A spring 49 is connected to the frame at 51 and to the other end of the arm at 53. A cam follower 55 is rotatably mounted on the arm by a stud shaft 57. As illustrated in FIGURE 19, the cam rotates in the direction of the arrow so that the follower 55 will raise the arm 43 under tension of the spring 49 and when the follower 55 reaches the point illustrated in FIGURE 20 full tension will be placed on the spring 49. As the follower moves forward to the drop off portion 41 of the cam the release of the tension on the spring 49 will aid or accelerate the rotation of the cam to provide additional torque to the shaft 15 so that the indicators 59 will be positively rotated. This will lessen the burden on the stepping motor 11 when two or more indicators are to be rotated with a single step of the stepping motor. The reference numeral 61 designates a mounting frame for the stepping motor 11 and the numeral 63 represents a mounting plate for the electrical leads for the stepping motor.

Referring to FIGURES 22–25 the transfer gear 23 is mounted on a shaft 65 which is supported by bracket 67 mounted on the frame 69. Mounted on one end of the shaft is an actuator 71 provided with an outwardly turned flange 73 having a radial cutout portion 75 to receive a pawl 77 mounted on the end of the shaft 65. A spacer 79 (FIG. 25) is disposed between the gear 23 and actuator 71 so that the pawl 77 is in alignment with the gear 81 mounted on the drum 83 for the next indicator 59. It is readily apparent that with one complete rotation of the gears 21 and 23 the pawl 77 will rotate the gear 81 the distance of one tooth or 36 degrees. In other words, one rotation of the indicating wheel 19 represents 10/100 of a gallon. Upon one complete rotation of the hundredths wheel 19 the tenths indicator 85 will be rotated 36 degrees, which represents 1/10 of a gallon. It is advantageous to provide the actuator and pawl arrangement so that when the indicators are reset the cutout portion 75 of the actuator will permit the pawl to become disengaged from the gear 81. The transfer from the tenths indicator 85 to the gallon unit indicators 87 and 89 is accomplished by the same type of gear and pawl arrangement.

Figure 16:
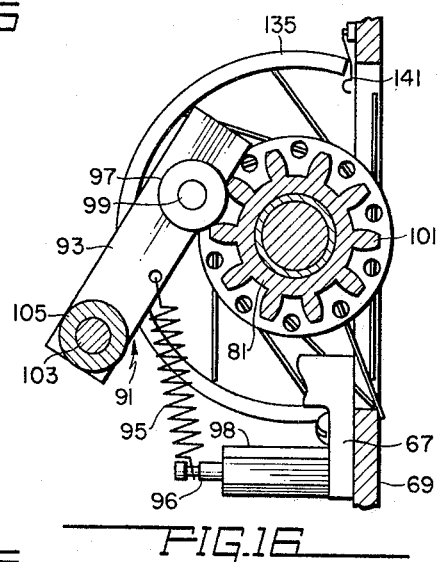
FIGURE 16 is a detail view of the friction brake for preventing overtravel of the indicator.
Figure 14:
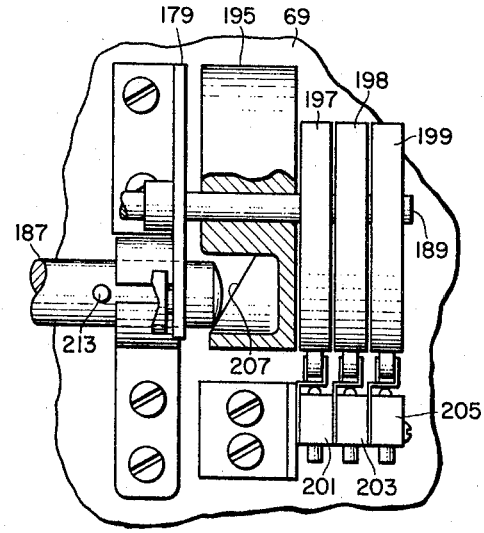
FIGURE 14 is a detail view of the cam and limit switch assembly with the reset shaft in the reset position.
Figure 15:
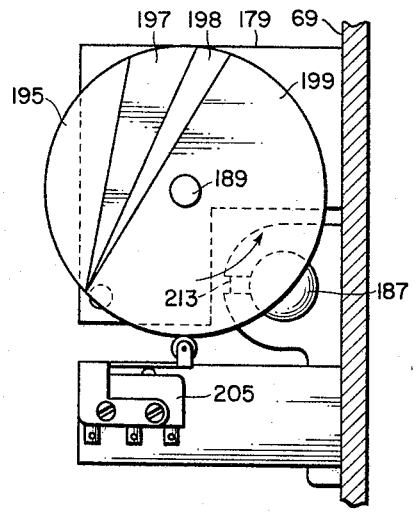
FIGURE 15 is an end view of the cam and limit switch assembly taken along line 15—15 of FIGURE 13.

Referring to FIGURE 16 a friction brake 91 is adapted to be applied to the gear 81 by means of an arm 93 having tension placed thereon by means of a spring 95 which is connected to a pin 96 carried by a bracket 98 mounted on the frame 69 by a bracket 67. A rotatable wheel 97 is mounted on the arm by a stud shaft 99 and is adapted to roll on the teeth 101 of the gear 81. The arm 93 is pivotally mounted on a shaft 103 which is supported on the frame by a bracket 105. The shaft is provided with spacers 107 (FIG. 1B) to properly align the wheels 97 with the drive gears and the indicators 85, 87 and 89. The frictional brake 91 serves to prevent the indicators from overriding when they are rotating at a high speed and thus prevents inaccuracy in the readout of the indicators.

Referring to FIGURES 11 and 12, the tenths indicator 85 will be described. The other indicators are substantially similar in construction and therefore will not be described. The reference numeral 83 designates a drum having the drive gear 81 mounted thereon. Two annular members 109 and 111 are spaced on the drum for supporting flap members 113 and 115. The flaps 113 and 115 are provided with a recess 117 and a small projection 119 which is carried by nylon bearings 121 mounted in the annular members 109 and 111. The drum 83 is provided with an opening 123 for receiving a pin 125. The pin 125 is mounted on the drum by means of a leaf spring 127 and securing means 129, such as a wire wrap or solder. The drum 83 is provided with a longitudinal recess 131 to receive the leaf spring and a radial recess 133 to receive the wire wrap.

Referring to FIGURES 1B, 22, 23 and 24, a spacing guide 135 is mounted on the frame 69 by means of a bracket 137 and screws 139. The arcuate spacing guide is provided with a radius smaller than the length of the flaps thereby preventing the flaps from coming in contact with each other when the drum 83 is rotated. A leaf spring 141 is mounted on the frame 69 and extends slightly in front of the opening 143 to prevent the flaps from dropping past the proper numeral when the indicator is operating at high speed.

Referring to FIGURE 1B, the stepping motor 145 is actuated by a computer such as that shown in my co-pending application, Serial No. 158,670, filed December 12, 1961. The stepping motor 145 drives a shaft 147 thereby rotating a drive gear 149 which is in mesh with gear 151 and thus rotates the hundredths indicator 153. The indicators 155 and 157 are actuated by a gear mechanism and pawl substantially similar to that previously illustrated in the description of the gear stepping motor mechanism 11.

The price setting mechanisms 159, 161 and 163 are mounted on the frame 69 by a bracket 165. The construction of the price setting mechanism is shown and described in my co-pending application, Serial No. 177,435, filed March 5, 1962.

Referring to FIGURES 1A, 1B, 2, 3, 4, 5 and 13, the reference numeral 167 designates a reset motor which is adapted to be energized by a manual switch (not shown). The reset motor 167 drives a shaft 169 having a worm gear 171 mounted thereon which is in mesh with a gear 173 mounted on a shaft 175 supported by brackets 177 and 179 mounted on the frame 69. A gear 181 mounted on the shaft 175 drives a transfer gear 183, transmitting motion to a gear 185 which will rotate freely on the shaft 187. The transfer gear 183 drives a shaft 189 carried by the brackets 177 and 179 provided with spacers 191 and 193. A number of cams 195, 197, 198 and 199 are rotated by the shaft 189. When the cams 197, 198 and 199 are rotated they will operate mercury switches 201, 203 and 205 to deenergize the stepping motors 11 and 145 respectively and provides a holding circuit for the reset motor 167, as described in my co-pending application.

The cam 195 is provided with a sharp rise 207 which is in contact with the end of the shaft 187. When the cam 195 is rotated the shaft 187 will slide longitudinally to the left, as viewed in FIGURE 1B, through oversized openings in the brackets 209, and 211 and the drums 83 of the indicators 59. When the shaft has shifted to the left the pin 213 engages the lug or dog 215 on the gear 185 whereby the shaft 187 will be rotated with the gear 185.

A brake 247 is mounted on the frame 69 by a bracket 249 and is connected to the worm gear by a pin 251. The brake 247 is operated by a solenoid 253 which is adapted to be energized simultaneously with the reset motor 167. When the reset motor is deenergized the solenoid will be deenergized and the spring 255 will operate the brake 247 to prevent overtravel of the worm gear 171.

Referring now to FIGURES 6, 7, 8 and 9, the detailed construction of the shaft 187 will be described. The shaft is machined into two parts 217 and 219 which are connected together by a coupling 221. A slot 223 is disposed at one end of the shaft 219 and a pin 225 is disposed at one end of the coupling member 221. The shaft is provided with a series of spaced radial recesses 227 having the sides cone-shaped or diverging inwardly at 229. A slot 231 is cut in the shaft longitudinally of the recesses 227. It should be noted that this slot is machined with two different radii 233 and 235 to provide a raised portion 237 in the slot. It has been found that in the reset operation of the indicator the provision of the two slots on different radii is rather important. The first radii 233 will provide a larger area for the pin 125 to contact and thus compensate for any misalignment of the shaft with respect to the indicators.

Referring to FIGURE 8, it will be seen that the shaft is provided with a bore 239 for receiving a spring 241 and a pin 243 in contact with a stop 245.

Referring to FIGURES 10, 11 and 12, it will be seen that the drum 83 of the indicator mechanism is positioned on the shaft so that the pin 125 will be disposed in the recess 227 when the indicator is in the operating position. As the shaft 187 is moved longitudinally to the left the cone portion 229 will raise the pin 125 against the resistance of the spring 127. As the pin rises on the cone portion 229 it will come in contact with the radial slot 233 and be cammed into the radial portion 235 of the longitudinal slot 231. When the pin 125 is disposed in the slot 231 the shaft will rotate the indicator drum 83 to the zero position. When the shaft 187 is rotated 160 degrees the cam 195 will permit the shaft to shift back to its normal operating position.

A neon light 257 is mounted in a flange 259 which forms part of the frame 69.

*Operation*

The stepping motors 11 and 145 are adapted to be operated from an electrical computer such as that described in my co-pending application, Serial No. 158,670, filed December 12, 1961, now Patent No. 3,199,727. Each step of the stepping motor will rotate the gears 13 and 17 to advance the hundredth wheel 19 approximately 36 degrees to indicate a value of 1/100th. For each 360° revolution of the hundredth wheel 19 the tenth indicator 85 will be actuated or moved 36° to indicate a value of 1/10th. This is accomplished through the rotation of gear 21, gear 23 and pawl 77. As the indicator wheel 19 is rotated 360° the cam 37 places tension on the arm 43. When the wheel 19 substantially completes the 360° rotation the follower 55 drops off the offset 41 of the cam to provide an additional torque to the shaft 15 to rotate both the hundredth wheel and the tenth wheel. This additional torque is provided so that the stepping motor will not be overloaded when rotating a series of indicators simultaneously. The indicators 87 and 89 are operated substantially in the same manner as indicator 85 through a gear train and pawl mechanism, each of which progresses in units of tens.

The friction brake, in the form of an arm 93 and spring 95 and a roller 97 adapted to rotate on the gear 81, serves to prevent the indicators from overtraveling in operation. An arcuate guide or spacer is positioned on the frame to prevent the flaps from piling on top of each other when the indicators are rotated.

The stepping motor 145 drives the monetary indicators 153, 155 and 157 and operates in substantially the same manner as the gallon indicators 85, 87 and 89.

The reset motor 167 is normally deenergized during the operation of the indicator. When it is desired to reset the indicators to zero, simultaneously with the energization of the reset motor 167 the solenoid 253 is energized to release the brake 247 on the shaft 169. The reset motor 167 will rotate the cams 195, 197, 198 and 199 through the following gear train: shaft 169, worm gear 171, gear 173, shaft 175, gear 181, gear 183 and shaft 189. The cams 197, 198 and 199 will operate mercury switches 201, 203 and 205 to provide a holding circuit for the reset motor 167 and to energize the stepping motors 11 and 145 so that a drag on the shafts 15 and 147 will be eliminated. The cam 195 will shift the shaft 187 to the left as viewed in FIGURE 1B on its longitudinal axis. A pin 213 disposed transversely of the shaft 187 will come in contact with the lug 215 mounted on gear 185 which is rotated by the gear 183. When the lug 215 contacts the pin 213 it will rotate the shaft 187 to reset all of the indicators mounted on the shaft.

As will be seen in FIGURES 7, 10, 11 and 12, the shaft is provided with a recess or groove 227 which permits the pin 125 to be ineffective. As soon as the shaft 187 is shifted to the left the pin 125 will be raised under tension of a leaf spring 127 by means of the cone portion 229 on the shaft. When the pin 125 reaches the groove or recess 233 it will be cammed into the recess 231 whereby the shaft 187 will rotate the drum 83 of the indicator to reset the flaps to zero. After the shaft has been rotated the mercury switch on the holding circuit will be opened and the reset motor 167 will be deenergized.

It is to be understood in connection with this invention that the embodiments shown are only exemplary, and that various modifications can be made in construction and arrangement within the scope of the invention as defined in the appended claims.

I claim:

1. In an indicating mechanism for mechanical counters of the type used in gasoline dispensing service stations in which the gallons of gasoline and monetary value of gasoline dispensed are indicated, comprising in combination:
   (a) a reset shaft adapted to support in a substantially horizontal line a first bank of indicating wheels for gallons of gasoline dispensed and a second bank of indicating wheels for the monetary value of gallons dispensed,
   (b) a first stepping motor for rotating the gallon indicating wheels in the transfer direction,
   (c) a first gear train means operatively connecting the first stepping motor with the gallon indicating wheels,
   (d) a second stepping motor for rotating the monetary wheels in the transfer direction,
   (e) a second gear train means operatively connecting the second stepping motor with the monetary wheels,
   (f) a reset motor provided with means for energizing or deenergizing said reset motor,
   (g) means for connecting the reset motor to the reset shaft when the reset motor is energized to rotate the gallon indicating wheels and the monetary wheels simultaneously to a zero position.

2. In an indicating mechanism for counters of the type used with electronically controlled dispensers of fuels, comprising in combination:
   (a) a reset shaft adapted to support in a substantially horizontal line a first indicating means for gallons of fuel dispensed and a second indicating means for the monetary value of gallons dispensed,
   (b) a first stepping motor operatively connected to the gallon indicating means for advancing the gallon indicating means in the transfer direction,
   (c) a second stepping motor operatively connected to the monetary indicating means for advancing the monetary means in the transfer direction,
   (d) a reset motor provided with means for selectively energizing or deenergizing said reset motor,
   (e) means for operatively connecting the reset motor to the reset shaft when the reset motor is energized to reset the gallon indicating means and monetary means simultaneously to a zero position, and
   (f) means to deenergize the first and second stepping motors when the reset motor is energized.

3. In an indicating mechanism for counters of the type used with electronically controlled dispensers of fuels comprising, in combination:
   (a) a reset shaft adapted to support in a substantially horizontal line a first indicating means for gallons of fuel dispensed and a second indicating means for the monetary value of gallons dispensed,
   (b) a first stepping motor operatively connected to the gallon indicating means for advancing the gallon indicating means in the transfer direction,
   (c) a second stepping motor operatively connected to the monetary indicating means for advancing the monetary means in the transfer direction,
   (d) said monetary indicating means adapted to advance concurrently with the gallon indicating means to record the monetary value of the gallons dispensed,
   (e) a reset motor including means for selectively energizing or deenergizing said reset motor,
   (f) means for operatively connecting the reset motor to the reset shaft when the reset motor is energized to reset the gallon indicating means and monetary means to a zero position,
   (g) means to deenergize the first and second stepping motors when the reset motor is energized, and
   (h) brake means to prevent overrunning of the gallon and monetary indicating means during the reset operation.

4. In an indicating mechanism for counters of the type used with electronically controlled dispensers of fuels comprising, in combination:
   (a) a reset shaft adapted to support in a substantially horizontal line a first indicating means for gallons of fuel dispensed and a second indicating means for the monetary value of gallons dispensed, (b) a first stepping motor operatively connected to the gallon indicating means for advancing the gallon indicating means in the transfer direction, (c) a second stepping motor operatively connected to the monetary indicating means for advancing the monetary means in the transfer direction, (d) said monetary indicating means adapted to advance concurrently with the gallon indicating means to record the monetary value of the gallons dispensed, (e) a reset motor including means for selectively energizing or deenergizing said reset motor, (f) means for operatively connecting the reset motor to the reset shaft when the reset motor is energized to reset the gallon indicating means and monetary means to a zero position, (g) means to deenergize the first and second stepping motors when the reset motor is energized, and (h) a solenoid operated brake means operatively associated with the reset motor to prevent over-travel of the gallon and monetary indicating means during the reset operation.

5. In an indicating mechanism for counters of the type used with electronically controlled dispensers of fuels comprising, in combination:

(a) a reset shaft adapted to support a first series of indicating wheels for gallons of gasoline dispensed and a second series of indicating wheels for the monetary value of gallons dispensed, (b) a first stepping motor including means for rotating the gallon indicating wheels in a transfer direction, (c) a second stepping motor including means for rotating the monetary indicating wheels in a transfer direction, (d) said rotating means including a pawl and actuator having an outwardly turned flange provided with a recessed portion to engage said pawl, (e) said pawl and actuator adapted to rotate at least one of the indicating wheels a predetermined distance, (f) a reset motor including means for selectively energizing or deenergizing said reset motor, and (g) means for operatively connecting the reset motor to the reset shaft when the reset motor is energized to reset all the indicating wheels to a zero position.

6. In an indicating mechanism for counters of the type used with electronically controlled dispensers of fuels comprising, in combination:

(a) a reset shaft adapted to support a first series of indicating wheels for gallons of gasoline dispensed and a second series of indicating wheels for the monetary value of gallons dispensed, (b) a first stepping motor including first drive means for rotating the gallon indicating wheels in a transfer direction, (c) a second stepping motor including second drive means for rotating the monetary indicating wheels in a transfer direction, (d) said rotating means including a pawl and actuator having an outwardly turned flange provided with a recessed position to engage said pawl, (e) said pawl and actuator adapted to rotate at least one of the indicating wheels a predetermined distance, (f) an aiding cam forming a part of each drive means and having a co-acting cam follower and resilient means to provide additional force to the indicating wheels at the point of transfer from one digit to the next, (g) a reset motor including means for selectively energizing or deenergizing said reset motor, and (h) means for operatively connecting the reset motor to the reset shaft when the reset motor is energized to reset all the indicating wheels to a zero position.

7. In an indicating mechanism for counters of the type used with electronically controlled dispensers of fuels comprising, in combination:

(a) a reset shaft adapted to support a first series of indicating wheels for gallons of gasoline dispensed and a second series of indicating wheels for the monetary value of gallons dispensed, (b) a first stepping motor including first drive means for rotating the gallon indicating wheels in a transfer direction, (c) a second stepping motor including second drive means for rotating the monetary indicating wheels in a transfer direction, (d) said rotating means including a pawl and actuator having an outwardly turned flange provided with a recessed position to engage said pawl, (e) said pawl and actuator adapted to rotate at least one of the indicating wheels a predetermined distance, (f) an aiding cam forming a part of each drive means and having a co-acting cam follower and resilient means to provide additional force to the indicating wheels at the point of transfer from one digit to the next, (g) a pair of ratchet wheels having a leaf spring in contact therewith to prevent backlashing of the indicating wheels when the stepping motors are energized or deenergized in rapid succession, (h) a reset motor including means for selectively energizing or deenergizing said reset motor, and (i) means for operatively connecting the reset motor to the reset shaft when the reset motor is energized to reset all the indicating wheels to a zero position.

8. In an indicating mechanism for counters of the type used with electronically controlled dispensers of fuels comprising, in combination:

(a) a reset shaft adapted to support a first series of indicating wheels for gallons of gasoline dispensed and a second series of indicating wheels for the monetary value of gallons dispensed, (b) a first stepping motor including means for rotating the gallon indicating wheels in a transfer direction, (c) a second stepping motor including means for rotating the monetary indicating wheels in a transfer direction, (d) a reset motor including means for selectively energizing or deenergizing said reset motor, (e) means for operatively connecting the reset motor to the reset shaft when the reset motor is energized including means for shifting the reset shaft laterally a predetermined distance, (f) said reset shaft having a plurality of radial spaced recesses with a transverse slot disposed across each recess, said slot being formed with two different radii so that a small projection is disposed in the slot adjacent one edge of the radial recess, and (g) each of said indicating wheels having means to engage the shaft in the slot when the reset shaft is shifted laterally a predetermined distance to reset all indicating wheels to a zero position when the reset motor is energized.

9. In an indicating mechanism for counters of the type used with electronically controlled dispensers of fuels comprising, in combination:

(a) a reset shaft adapted to support a first series of indicating wheels for gallons of gasoline dispensed and a second series of indicating wheels for the monetary value of gallons dispensed, (b) a first stepping motor including means for rotating the gallon indicating wheels in a transfer direction, (c) a second stepping motor including means for rotating the monetary indicating wheels in a transfer direction, (d) a reset motor including means for selectively energizing or deenergizing said reset motor, (e) means for operatively connecting the reset motor to the reset shaft when the reset motor is energized including means for shifting the reset shaft laterally a predetermined distance, (f) said reset shaft having a radial recess spaced for each indicating wheel with a portion of each side of the recess cut away to provide a cam section for each recess, said shaft provided with a transverse slot disposed across each recess, said slot being formed with two different radii so that a small projection is disposed in the slot adjacent one edge of the cam section, and (g) each of said indicating wheels having a pin adapted to be disposed in said recess permitting the wheel to rotate freely, said pin adapted to engage the slot in the shaft when the shaft is shifted laterally a predetermined distance to reset all indicating wheels to a zero position when the reset motor is energized.

10. In an indicating mechanism for counters of the type used with electronically controlled dispensers of fuels comprising, in combination:

(a) a reset shaft adapted to support in a substantially horizontal line a first series of indicating wheels for gallons of fluid dispensed and a second series of indicating wheels for the monetary value of gallons dispensed, (b) each wheel provided with means for positioning and retarding each wheel on said reset shaft, (c) a first stepping motor including means for rotating the gallon indicating wheels in a transfer direction, (d) a second stepping motor including means for rotating the monetary indicating wheels in a transfer direction, (e) a reset motor including means for selectively energizing or deenergizing said reset motor, (f) means for operatively connecting the reset motor to the reset shaft when the reset motor is energized including means for shifting the reset shaft laterally a predetermined distance, (g) said reset shaft having a plurality of radial spaced recesses with a transverse half moon slot having two different radii disposed across each recess, (h) each of said indicating wheels having means to engage the shaft in the slot when the reset shaft is shifted laterally a predetermined distance to reset all indicating wheels to a zero position when the reset motor is energized.

References Cited by the Examiner

UNITED STATES PATENTS

| | | | |
|---|---|---|---|
| 2,428,383 | 10/1947 | Prangley et al. | 222—26 |
| 2,568,709 | 9/1951 | Bliss | 235—144 |
| 2,814,444 | 11/1957 | Bliss | 235—117 X |
| 2,637,492 | 5/1963 | Winch | 235—133 |
| 3,100,062 | 8/1963 | Spalding | 235—61 |

FOREIGN PATENTS 114,247 12/1955 France.

RICHARD B. WILKINSON, *Primary Examiner.*

LEO SMILOW, LOUIS J. CAPOZI, *Examiners.*

J. A. SPELDRICH, W. F. BAUER,
*Assistant Examiners.*